United States Patent [19]

Knauer et al.

[11] Patent Number: 4,829,465
[45] Date of Patent: May 9, 1989

[54] HIGH SPEED COSINE TRANSFORM

[75] Inventors: Scott C. Knauer, Mountainside; Jay H. O'Neill, Freehold, both of N.J.

[73] Assignee: American Telephone and Telegraph Company, AT&T Bell Laboratories, Murray Hill, N.J.

[21] Appl. No.: 876,076

[22] Filed: Jun. 19, 1986

[51] Int. Cl.$^4$ ............................................. G06F 7/38
[52] U.S. Cl. .................................................. 364/725
[58] Field of Search ....................................... 364/725

[56] References Cited

U.S. PATENT DOCUMENTS

| | | | |
|---|---|---|---|
| 3,988,605 | 10/1976 | Guillou et al. | 364/725 |
| 4,152,772 | 5/1979 | Speiser et al. | 364/725 |
| 4,196,448 | 4/1980 | Whitehouse et al. | 364/725 |
| 4,385,363 | 5/1983 | Widergren et al. | 364/725 |
| 4,449,194 | 5/1984 | Wilhelm | 364/725 |
| 4,510,578 | 4/1985 | Miyaguchi et al. | 364/725 |

OTHER PUBLICATIONS

Smith et al., "A Fast Computational Algorithm for the Discrete Cosine Transform," *IEEE Trans. M Communications*, vol. COM-25, #9, pp. 1004–1009, Sep. 1977.

Speiser, "Image Transmission via Spread Spectrum Techniques", *Arpa Quarterly Technical Report*, 1974, pp. B1–B14.

*Primary Examiner*—Gary V. Harkcom
*Assistant Examiner*—Dale M. Shaw
*Attorney, Agent, or Firm*—Henry T. Brendzel

[57] ABSTRACT

A discrete transform cosine circuit utilizing symmetries of the cosine matrix of coefficients to allow all multiplications to be done by "constant multipliers" comprising combinations of look-up tables and adders. Transform coefficients are developed by dividing each into a sequence of blocks of preselected size, the information in the blocks is sorted to develop a specific order and the reordered blocks are applied seriatim to a first one-dimensional cosine transform circuit employing the constant multipliers. The output of the first cosine transform circuit is applied to a transposing memory and then to a second cosine transform circuit that also employs "constant multipliers".

17 Claims, 10 Drawing Sheets

$$
\begin{bmatrix} C_0 \\ C_1 \\ C_2 \\ C_3 \\ C_4 \\ C_5 \\ C_6 \\ C_7 \\ C_8 \\ C_9 \\ C_{10} \\ C_{11} \\ C_{12} \\ C_{13} \\ C_{14} \\ C_{15} \end{bmatrix}
=
\begin{bmatrix}
707 & 707 & 707 & 707 & 707 & 707 & 707 & 707 & 707 & 707 & 707 & 707 & 707 & 707 & 707 & 707 \\
995 & 956 & 881 & 773 & 634 & 471 & 290 & 098 & -098 & -290 & -471 & -634 & -773 & -881 & -958 & -995 \\
980 & 831 & 555 & 195 & -195 & -555 & -831 & -980 & -980 & -831 & -555 & -195 & 195 & 555 & 831 & 980 \\
956 & 634 & 098 & -471 & -881 & -995 & -773 & -290 & 290 & 773 & 995 & 881 & 471 & -098 & -634 & -956 \\
923 & 382 & -382 & -923 & -923 & -382 & 382 & 923 & 923 & 382 & -382 & -923 & -923 & -382 & 382 & 923 \\
881 & 098 & -773 & -956 & -290 & 634 & 995 & 471 & -471 & -995 & -634 & 290 & 956 & 772 & -098 & -881 \\
831 & -195 & -980 & -555 & 555 & 980 & 195 & -831 & -831 & 195 & 980 & 555 & -555 & -980 & -195 & 831 \\
773 & -471 & -956 & 098 & 995 & 290 & -881 & -634 & 634 & 881 & -290 & -995 & -098 & 956 & 471 & -773 \\
707 & -707 & -707 & 707 & 707 & -707 & -707 & 707 & 707 & -707 & -707 & 707 & 707 & -707 & -707 & 707 \\
634 & -881 & -290 & 995 & -098 & -956 & 471 & 772 & -773 & -471 & 956 & 098 & -995 & 290 & 881 & -634 \\
555 & -980 & 195 & 831 & -831 & -195 & 980 & -555 & -555 & 980 & -195 & -831 & 831 & 195 & -980 & 555 \\
471 & -995 & 634 & 290 & -956 & 773 & 097 & -881 & 881 & -098 & -772 & 956 & -290 & -634 & 995 & -471 \\
382 & -923 & 923 & -382 & -382 & 923 & -923 & 382 & 382 & -923 & 923 & -382 & -382 & 923 & -923 & 382 \\
290 & -773 & 995 & -881 & 471 & 097 & -634 & 956 & -956 & 634 & -098 & -471 & 881 & -995 & 773 & -290 \\
195 & -555 & 831 & -980 & 980 & -831 & 555 & -195 & -195 & 555 & -831 & 980 & -980 & 831 & -555 & 195 \\
098 & -290 & 471 & -634 & 772 & -881 & 956 & -995 & 995 & -956 & 881 & -773 & 634 & -471 & 290 & -098
\end{bmatrix}
\times
\begin{bmatrix} P_0 \\ P_1 \\ P_2 \\ P_3 \\ P_4 \\ P_5 \\ P_6 \\ P_7 \\ P_8 \\ P_9 \\ P_{10} \\ P_{11} \\ P_{12} \\ P_{13} \\ P_{14} \\ P_{15} \end{bmatrix}
$$

FIG. 4

$$
\begin{bmatrix} C_0 \\ C_8 \\ C_4 \\ C_{12} \\ C_2 \\ C_{10} \\ C_{14} \\ C_6 \\ C_1 \\ C_{11} \\ C_7 \\ C_{13} \\ C_{15} \\ C_5 \\ C_9 \\ C_3 \end{bmatrix} = \begin{bmatrix} 707 & 707 & 707 & 707 & 707 & 707 & 707 & 707 & 707 & 707 & 707 & 707 & 707 & 707 & 707 & 707 \\ 707 & -707 & 707 & -707 & 707 & -707 & 707 & -707 & 707 & -707 & 707 & -707 & 707 & -707 & 707 & -707 \\ 923 & -923 & 382 & -382 & 382 & -382 & 923 & -923 & 923 & -923 & 382 & -382 & 382 & -382 & 923 & -923 \\ 382 & -382 & 923 & -923 & 923 & -923 & 382 & -382 & 382 & -382 & 923 & -923 & 923 & -923 & 382 & -382 \\ 980 & -555 & 195 & 831 & -980 & 555 & -195 & -831 & 831 & -195 & 555 & -980 & 831 & -195 & 555 & -980 \\ 555 & -195 & 831 & -980 & 555 & -195 & 831 & -980 & -980 & 831 & -195 & 555 & -980 & 831 & -195 & 555 \\ 195 & -831 & 980 & -555 & -555 & 980 & -831 & 195 & 195 & -831 & 980 & -555 & -555 & 980 & -831 & 195 \\ 831 & -980 & 555 & -195 & -195 & 555 & -980 & 831 & -831 & 980 & -555 & 195 & 195 & -555 & 980 & -831 \\ 995 & 471 & 773 & 290 & 098 & -881 & -634 & -956 & 956 & 634 & 881 & -098 & -290 & -773 & -471 & -995 \\ 471 & 773 & 290 & 098 & -881 & -634 & -956 & 995 & -995 & 956 & 634 & 881 & -098 & -290 & -773 & 471 \\ 773 & 290 & 098 & -881 & -634 & -956 & 995 & 471 & -471 & -995 & 956 & 634 & 881 & -098 & -290 & -773 \\ 290 & 098 & -881 & -634 & -956 & 995 & 471 & 773 & -773 & -471 & -995 & 956 & 634 & 881 & -098 & -290 \\ 098 & -881 & -634 & 956 & 995 & 471 & 773 & 290 & -290 & -773 & -471 & -995 & 956 & 634 & 881 & -098 \\ 881 & 634 & -956 & 995 & 471 & -773 & -290 & 098 & -098 & -290 & -773 & 471 & -995 & 956 & 634 & 881 \\ 634 & -956 & 995 & -471 & 773 & -290 & 098 & -881 & 881 & -098 & 290 & -773 & 471 & -995 & 956 & 634 \\ 956 & -995 & -471 & -773 & -290 & 098 & -881 & 634 & -634 & 881 & -098 & 290 & -773 & 471 & -995 & 956 \end{bmatrix} \times \begin{bmatrix} P_0 \\ P_5 \\ P_3 \\ P_6 \\ P_7 \\ P_2 \\ P_4 \\ P_1 \\ P_{15} \\ P_{10} \\ P_{12} \\ P_4 \\ P_8 \\ P_{13} \\ P_{11} \\ P_{14} \end{bmatrix}
$$

$$\begin{bmatrix} C_0 \\ C_8 \\ C_4 \\ C_{12} \\ C_2 \\ C_{10} \\ C_{14} \\ C_6 \end{bmatrix} = \begin{bmatrix} 707 & 707 & 707 & 707 & 707 & 707 & 707 & 707 \\ 707 & 707 & 707 & 707 & 707 & 707 & 707 & 707 \\ 923 & -382 & -923 & 382 & 382 & -923 & -382 & 923 \\ -382 & -923 & 382 & 923 & -923 & -382 & 923 & 382 \\ 980 & 555 & 195 & -831 & -831 & 195 & 555 & 980 \\ -555 & 195 & 831 & 980 & -980 & -831 & -195 & 555 \\ 195 & -831 & 980 & -555 & 555 & -980 & 831 & -195 \\ 831 & 980 & -555 & 195 & -195 & 555 & -980 & 831 \end{bmatrix} \times \begin{bmatrix} P_0 + P_{15} \\ P_5 + P_{10} \\ P_3 + P_{12} \\ P_6 + P_9 \\ P_7 + P_8 \\ P_2 + P_{13} \\ P_4 + P_{11} \\ P_1 + P_{14} \end{bmatrix}$$

$$\begin{bmatrix} C_1 \\ C_{11} \\ C_7 \\ C_{13} \\ C_{15} \\ C_5 \\ C_9 \\ C_3 \end{bmatrix} = \begin{bmatrix} 995 & 471 & 773 & 290 & 098 & 881 & 634 & 956 \\ 471 & 773 & 290 & 098 & -881 & 634 & -956 & -995 \\ 773 & 290 & 098 & -881 & -634 & -956 & 995 & -471 \\ 290 & 098 & -881 & -634 & 956 & 995 & 471 & -773 \\ 098 & -881 & -634 & 956 & -995 & 471 & 773 & -290 \\ 881 & 634 & -956 & 995 & 471 & -773 & -290 & 098 \\ 634 & -956 & 995 & 471 & 773 & -290 & -098 & -881 \\ 956 & -995 & -471 & -773 & -290 & 098 & -881 & 634 \end{bmatrix} \times \begin{bmatrix} P_0 - P_{15} \\ P_5 - P_{10} \\ P_3 - P_{12} \\ P_6 - P_9 \\ P_7 - P_8 \\ P_2 - P_{13} \\ P_4 - P_{11} \\ P_1 - P_{14} \end{bmatrix}$$

$$
\begin{bmatrix} P_0 \\ P_9 \\ P_3 \\ P_6 \\ P_7 \\ P_2 \\ P_4 \\ P_1 \\ P_{15} \\ P_{10} \\ P_{12} \\ P_4 \\ P_8 \\ P_{13} \\ P_{11} \\ P_{14} \end{bmatrix}
=
\begin{bmatrix}
707 & 707 & 923 & 382 & 980 & 555 & 195 & 831 & 995 & 471 & 773 & 290 & 098 & 881 & 634 & 956 \\
707 & -707 & -382 & 923 & -555 & -195 & 831 & 980 & 471 & 773 & 290 & 098 & -881 & 634 & -956 & -995 \\
707 & 707 & -923 & -382 & 195 & 831 & -980 & -555 & 773 & 290 & 098 & -881 & -634 & -956 & 995 & -471 \\
707 & -707 & 382 & -923 & -980 & 555 & -195 & 195 & 290 & 098 & -881 & -634 & 956 & 471 & 772 & -290 \\
707 & 707 & 923 & 382 & -923 & -980 & 555 & -195 & 098 & -881 & -634 & 956 & 995 & 471 & -773 & -290 \\
707 & -707 & -382 & 923 & -195 & 831 & 980 & -831 & -881 & -634 & 956 & 995 & -471 & 773 & -290 & 098 \\
707 & 707 & -923 & -382 & 831 & -980 & 555 & -195 & -634 & 956 & 995 & 471 & 773 & -290 & -098 & -881 \\
707 & -707 & 382 & -923 & 980 & 555 & -195 & 831 & -956 & -995 & 471 & -773 & -290 & 098 & -881 & 634 \\
707 & 707 & 923 & 382 & -980 & 555 & -195 & 831 & -956 & 995 & -471 & -773 & -290 & 098 & -881 & 634 \\
707 & -707 & -382 & 923 & 555 & -195 & 195 & 831 & -995 & 471 & -773 & -290 & -098 & 881 & -634 & -956 \\
707 & 707 & -923 & -382 & -195 & 831 & -980 & 555 & -471 & -773 & -290 & -098 & 881 & -634 & 956 & 995 \\
707 & -707 & 382 & -923 & -831 & -980 & 555 & -195 & -773 & -290 & -098 & 881 & 634 & -956 & -955 & -471 \\
707 & 707 & 923 & 382 & 195 & 831 & 980 & -555 & -290 & -098 & 881 & 634 & -956 & 995 & -471 & 773 \\
707 & -707 & -382 & 923 & 831 & -980 & 555 & 195 & -098 & 881 & 634 & -956 & 995 & -995 & 773 & 290 \\
707 & 707 & -923 & -382 & -831 & 555 & -195 & -634 & 881 & 290 & 098 & -471 & -773 & 290 & -098 \\
707 & -707 & 382 & -923 & 831 & -980 & 555 & -195 & -956 & 995 & 471 & 773 & 290 & -098 & 881 & -634
\end{bmatrix}
\times
\begin{bmatrix} C_0 \\ C_8 \\ C_4 \\ C_{12} \\ C_2 \\ C_{10} \\ C_{14} \\ C_6 \\ C_1 \\ C_{11} \\ C_7 \\ C_{13} \\ C_{15} \\ C_5 \\ C_9 \\ C_3 \end{bmatrix}
$$

FIG. 10

$$\begin{bmatrix} P_0 \\ P_5 \\ P_3 \\ P_6 \\ P_7 \\ P_2 \\ P_4 \\ P_1 \\ P_{15} \\ P_{10} \\ P_{12} \\ P_9 \\ P_8 \\ P_{13} \\ P_{11} \\ P_{14} \end{bmatrix} = \begin{bmatrix} a \\ b \\ a \\ b \\ a \\ b \\ a \\ b \\ a \\ b \\ a \\ b \\ a \\ b \\ a \\ b \end{bmatrix} + \begin{bmatrix} c \\ d \\ -c \\ -d \\ c \\ d \\ -c \\ -d \\ c \\ d \\ -c \\ -d \\ c \\ d \\ -c \\ -d \end{bmatrix} + \begin{bmatrix} e \\ f \\ g \\ h \\ -e \\ -f \\ -g \\ -h \\ e \\ f \\ g \\ h \\ -e \\ -f \\ -g \\ -h \end{bmatrix} + \begin{bmatrix} i \\ j \\ k \\ l \\ m \\ n \\ o \\ p \\ -i \\ -j \\ -k \\ -l \\ -m \\ -n \\ -o \\ -p \end{bmatrix}$$

$$\begin{bmatrix} a \\ b \end{bmatrix} \begin{bmatrix} 707 & 707 \\ 707 & -707 \end{bmatrix} \begin{bmatrix} C_6 \\ C_8 \end{bmatrix}$$

$$\begin{bmatrix} c \\ d \end{bmatrix} \begin{bmatrix} 923 & 382 \\ -382 & 923 \end{bmatrix} \begin{bmatrix} C_4 \\ C_{12} \end{bmatrix}$$

$$\begin{bmatrix} e \\ f \\ g \\ h \end{bmatrix} \begin{bmatrix} 980 & 555 & 195 & 831 \\ -555 & -195 & -831 & 980 \\ 195 & 831 & -980 & -555 \\ -831 & 980 & 555 & 195 \end{bmatrix} \begin{bmatrix} C_2 \\ C_{10} \\ C_{14} \\ C_6 \end{bmatrix}$$

$$\begin{bmatrix} i \\ j \\ k \\ l \\ m \\ n \\ o \\ p \end{bmatrix} \begin{bmatrix} 995 & 471 & 773 & 290 & 098 & 881 & 634 & 956 \\ 471 & 773 & 290 & 098 & 881 & 634 & 956 & 995 \\ 773 & 290 & 098 & 881 & 634 & 956 & 995 & 471 \\ 290 & 098 & 881 & 634 & 956 & 995 & 471 & 773 \\ 098 & 881 & 634 & 956 & 995 & 471 & 772 & 290 \\ 881 & 634 & 956 & 995 & 471 & 773 & 290 & 098 \\ 634 & 956 & 995 & 471 & 773 & 290 & 098 & 881 \\ 956 & 995 & 471 & 773 & 290 & 098 & 881 & 634 \end{bmatrix} \begin{bmatrix} C_1 \\ C_4 \\ C_7 \\ C_{13} \\ C_{15} \\ C_5 \\ C_9 \\ C_3 \end{bmatrix}$$

FIG. 11

HIGH SPEED COSINE TRANSFORM

BACKGROUND OF THE INVENTION

This relates to data processing apparatus for encoding and decoding two-dimensional information in an efficient manner. More particularly, this relates to apparatus for the creation of a two-dimensional cosine transform and its inverse.

Image data compression has been a topic of considerable interest in recent years because of the burgeoning fields of information and communication. Compression of image data is necessary because in order to achieve pleasing results a picture must contain a large number of pixels, or elemental picture elements. Such images, however, contain a large amount of redundant information. Researchers have tried to encode images in a number of ways to reduce this redundancy and to thereby realize transmission and storage savings. These encoding approaches can be broadly divided into pulse code modulation, interpolative or extrapolative coding, vector quantization, and transform coding.

In predictive coding, such as in the differential pulse code modulation (DPCM) approach, an attempt is made to predict the pixel to be encoded. The prediction is made by using the encoded values of the previously encoded pixels. Generally, these pixels are combined to generate a predicted value. The difference between the actual value and the generated predicted value is quantized and encoded prior to transmission or storage. Adaptive DPCM, where the prediction algorithm is based on local picture statistics, is a variation on this approach.

In interpolative and extrapolative coding, only a subset of the pixels is sent to the receiver. The receiver must then interpolate the available information to develop the decoded pixels.

In vector quantization, an image block is decomposed into a set of vectors. From the possible signal patterns and corresponding vectors, a subset of representative vectors is selected and included in a code book. When encoding, the developed sets of vectors are replaced with the closest representative vectors in the code book, and compression is achieved by further replacing the representative vectors with labels.

Finally, in transform coding, instead of coding the image as discrete intensity values of sampling points, an alternative representation is made first by transforming blocks of pixels into a set of coefficients. It is the coefficients that are quantized and transmitted. Several transformations have been used in the art, such as the Hadamard, the Karhunen-Loeve, and the Discrete Cosine Transforms. These transforms conserve the signal energy in the transform domain but, typically, most of the energy is concentrated in relatively few samples. Samples that are very close to zero need not be transmitted, and samples of relatively low value can be quantized coarsely. This results in substantial compression of the data that needs to be either stored or transmitted. Huffman coding is often used after quantizing to further reduce the transmission rate.

The Discrete Cosine Transform is a commonly applied transform. It is usually realized with processors built from TTL or ECL hardware which processes video at rates of about 8-10 megasamples per second. The transformation consists of multiplying an $n \times n$ matrix by an n element vector. Since parallel hardware multipliers are expensive, most theoretical work has concentrated on exploiting the symmetries of the cosine matrix to partition it into smaller matrices, so that the total number of multiplications is reduced. This results a variety of "Fast Discrete Cosine Transform" algorithms, which are close cousins of the FFT.

One such algorithm for computing the Discrete Cosine Transform is described by C. H. Smith in a paper entitled "A Fast Computational Algorithm for the Discrete Cosine Transform," published in the *IEEE Transactions on Communication*, September 1977. Based on this algorithm, Widergren et al., in U.S. Pat. No. 4,385,363, issued May 24, 1983, describe apparatus for developing the Discrete Cosine Transform by the use of a plurality of shuffle and add, together with shuffle, multiply and add circuits which employ discrete arithmetic logic units.

Employing a different architecture, R. L. Wilhelm describes a multiple point discrete transform processor in U.S. Pat. No. 4,449,194, issued May 15, 1984. The Wilhelm processor approximates each term of the Discrete Cosine Transform by power of 2 terms so that all mathematical steps are performed by shifting and/or subtracting digital signals.

Moving from TTL and ECL standard chips to VLSI designs allows more flexibility in multiplier designs. It is an object of this invention, therefore, to develop a Discrete Cosine Transform architecture that accomplishes the transformation more efficiently by utilizing the advantages inherent in VLSI designs.

SUMMARY OF THE INVENTION

In accordance with my invention, symmetries of the cosine matrix of coefficients are utilized to allow all multiplications to be done by "constant multipliers" comprising combinations of look-up tables and adders. Transform coefficients are developed by dividing each into a sequence of blocks of preselected size, the information in the blocks is sorted to develop a specific order and the reordered blocks are applied seriatim to a first one-dimensional cosine transform circuit employing the constant multipliers. The output of the first cosine transform circuit is applied to a transposing memory and then to a second cosine transform circuit that also employs "constant multipliers". Both the direct discrete cosine transform and the inverse discrete cosine transform are accomplished in this manner, and in one illustrative implementation both transforms are generated with the same constant multipliers and essentially the same support circuitry.

BRIEF DESCRIPTION OF THE DRAWING

My invention will be more fully appreciated from the following detailed description when considered in connection with the accompanying drawings in which:

FIG. 3 describes the matrix operation involved in computing a 16×16 forward cosine transform;

FIG. 4 presents a reordered representation of the FIG. 3 matrix operation;

FIG. 6 shows a simple rearrangement of the matrix multiplication of FIG. 4;

FIG. 9 presents the inverse transform matrix equation;

FIG. 10 illustrates a rearranged version of the FIG. 9 matrix which highlights the vertical and horizontal symmetries present the matrix.

DETAILED DESCRIPTION

Transform coding is usually applied as an intraframe coding technique which eliminates the redundancy in each single frame of video. In a typical transform coder, the picture is divided into blocks of size n×n (n pixels×n lines) where n is a power of 2 and is usually 8, 16 or 32. The transform operation is applied to each block, and its results replace the $n^2$ pixel values (local information) with $n^2$ transform coefficients (block-wide information). Each of the transform coefficients say something about the entire block. For example, the "DC coefficient" represents the average value of the pixels in the block. Other coefficients represent the extent to which certain two-dimensional spatial frequency patterns are present in the block. Because the cosine vector set is orthogonal, information in one coefficient cannot be represented by any any combination of the others.

Compression is achieved by discarding a number of coefficients (replacing them by zero at the decoder) and by restricting others to a smaller or coarser range of values. This approach works well because most of the information in the picture is contained in the low spatial frequency patterns, and the high frequency patterns have values close to zero. The eye is unlikely to miss the high frequency information that is thrown away.

Following the transform coding and quantization, Huffman coding is often used to reduce the transmission rate still further. Rare large values of high spatial frequency coefficients are given long codes while values at or near zero are given have very short codes.

Figure 1:
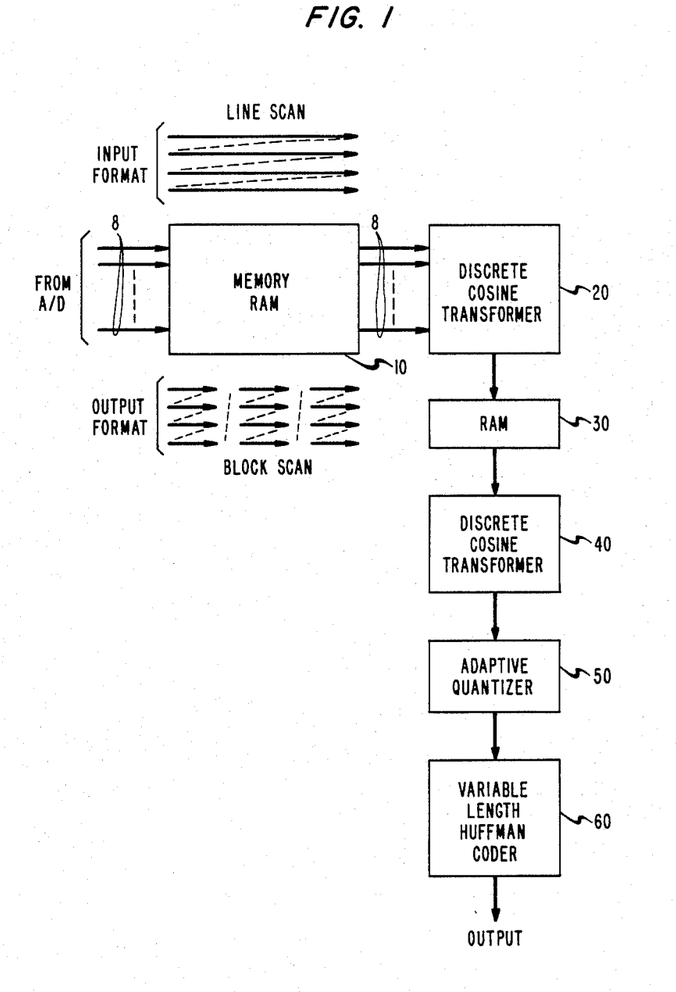
FIG. 1 is a block diagram of the forward discrete cosine transform coder.

FIG. 1 is a the block diagram of a 16×16 transform processor with m bit words. For a 16×16 transform and an initial sample accuracy of 8 bits, m ranges from 12 to 16 to avoid round-off errors. If compression is high, quantization error will be high and 12 bit accuracy will be sufficient. For more modest compression and higher quality, 14 to 16 bits is more appropriate. In FIG. 1, an initial 16 line "block reordering memory" 10 is used to rearrange each block of 16 raster scanned lines into blocks of 16 by 16, or 256 pels. It also serves the function of reordering the samples in each block in accordance with a preselected reordering pattern One such pattern is described below.

Because the cosine transform is "separable", meaning that the two-dimensional operation can be accomplished as a succession of two one-dimensional operations, in FIG. 1, the output of memory 10 is applied to a one-dimensional transform circuit 20; the output of transform circuit 20 is applied to a "scan transpose" memory 30; and the output of memory 30 is applied to a second one-dimensional cosine transform circuit 40 that is identical to circuit 20. Memory 30 is of size 256×m, and is used to reorder the horizontally transformed results of the first 16 element transform so that the second transform is applied "vertically". To the extent that circuit 20 provides a scrambled output (i.e., out of cardinal order of subscripts n) circuit 40 requires a differently reordered sequence of inputs. It is the function of memory 30 to develop whatever sequence of signals required by circuit 40 from the sequence of signals provided by circuit 20. The output of circuit 40 is the set of desired coefficients of the two-dimensional Discrete Cosine Transform. Optionally, the output of circuit 40 may be applied, as it is in FIG. 1, to a quantizer 50, followed by additional compression in a circuit such as the variable length encoder, 60.

A decoder is the inverse of the encoder. Corresponding to the encoder of FIG. 1, the decoder of FIG. 2 includes a buffer 15, Huffman decoder 25, and a representative value look-up ("de-quantizer") table 35 followed by the inverse cosine transform circuitry. The inverse cosine transform circuitry in accordance with the principles of my invention includes two identical transform stages, 45 and 65, surrounding a 256×m scan transpose memory 55. Optionally, there may be another memory (75) following stage 65. The inverse cosine transform differs from the forward transform in that it's cosine coefficients matrix is the transpose of the forward transform's matrix. This "matrix transpose" operation should not be confused with the "scan transpose", which re-orders coefficients in the two-dimensional space.

To enhance understanding of the principles of my invention, FIG. 3 describes the matrix operation involved in computing a 16×16 cosine transform. The P elements represent the pel samples, the numbers in the matrix are the cosine coefficients, (multiplied by 1000 merely to simplify the presentation) and the C elements represent the developed cosine transform coefficients. FIG. 4 presents one of a number of possible reorderings of the FIG. 3 matrix operation which highlights the symmetries present in the cosine coefficients matrix. This order produces segments or "blocks" in the matrix in which the constants on the left-bottom to top-right diagonals have the same absolute values.

Figure 5:
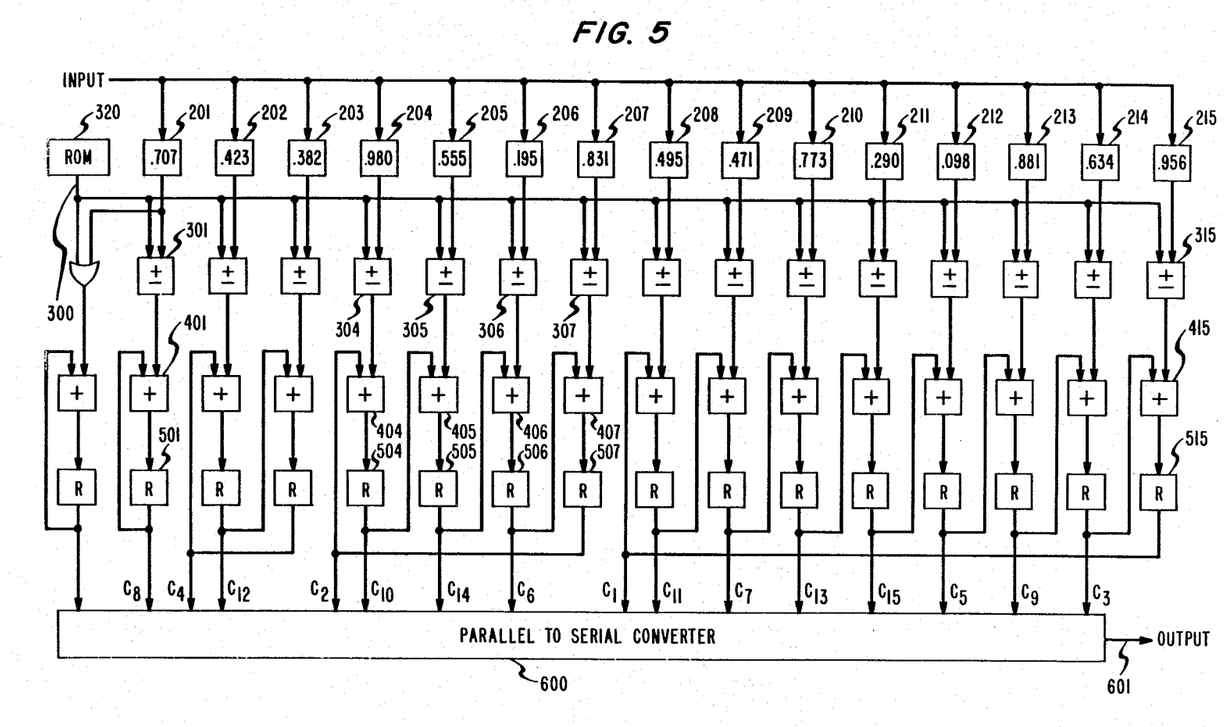
FIG. 5 depicts one embodiment of a forward cosine transform circuit.

FIG. 5 depicts an embodiment of the cosine transform circuit (20) of FIG. 1 which employs the symmetries apparent in FIG. 4. The FIG. 4 matrix can be segregated into two one coefficient segments (0.707), a two coefficient segment (0.923 and 0.382), a four coefficient segment (0.980, 0.555, 0.195, and 0.831), and an eight coefficient segment (0.995, 0.471, 0.773, 0.290, 0.980, 0.881, 0.634, and 0.956). The FIG. 5 circuit can be similarly segregated: e.g., multiplier 201 and its associated circuits, multipliers 202–203 and their associated circuitry, multipliers 204–207 and their associated circuits, and multipliers 208–215 and their associated circuits.

Turning attention to the four coefficient segment in FIG. 5 for an illustrative "walk through" of the circuits structure and operation, multipliers 204–207 are responsive to input pel samples which are applied on line 200 in the order depicted in FIG. 4; to wit, $P_0$, $P_5$, $P_3$, $P_6$, $P_7$, $P_2$, $P_4$, $P_1$, $P_{15}$, $P_{10}$, $P_{12}$, $P_9$, $P_8$, $P_{13}$, $P_{11}$, and $P_{14}$. Multipliers 204–207 develop output signals corresponding to the product of the signed input signals with the unsigned constants 0.980, 0.555, 0.195, and 0.831, respectively. Multipliers 204–207 (and the other multipliers in the FIG. 5 circuit—i.e., 201–203 and 208–215) are most simply implemented with small read-only memories, or combinations of read-only memories and adders as described, for example, in U.S. patent application by S. Ganapathy, Ser. No. 725,921, filed Apr. 22, 1985.

The output signals of multipliers 204–207 are applied to sign control circuits 304–307, respectively. Sign control circuits 304–307 account for the different signs that the multiplier coefficients must have (per the FIG. 4 matrix) under control of control signals applied by bus 300. More specifically, the circuit of FIG. 5 includes 15 sign control circuits (301–315) and, most simply, bus 300 includes 15 leads; each connected to a different sign control circuit.

With reference to the four-coefficient segment shown in FIG. 5, the output of sign control circuit 304 is applied to adder 404 and the output of adder 404 is applied to register 504. The output of sign control circuit 305 and the output of register 504 are applied to adder 405 and the output of adder 405 is applied to register 505. In a similar fashion, the output of sign control circuit 306 and the output of register 505 are applied to adder 406 and the output of adder 406 is applied to register 506. Finally, the output of sign control circuit 307 and the output of register 506 are applied to adder 407 and the output of adder 407 is applied to register 507. The output of register 507 is fed back to adder 404, closing a feedback loop and thereby forming a cyclical pipelined accumulator structure. The just-described cyclical pipelined accumulator is well adapted to the function of transform computation because of the cyclical organization existing in the four-coefficient segment of FIG. 4. Transform coefficient $C_2$ is developed by cycling through the sequence of multipliers 0.980, 0.555, 0.195, and 0.831. Offset by one, the transform coefficient $C_{10}$ is developed by cycling through the sequence of multipliers 0.555, 0.195, 0.831, and 0.980. Offset by one more, is transform coefficient $C_{14}$, and lastly comes transform coefficient $C_6$. The $C_2$ output is developed by multiplying $P_0$ in multiplier 204, temporarily storing the product in register 504, adding to that the product developed in multiplier 205 and storing it in register 505, adding to that the product developed in multiplier 206 and temporarily storing it in register 506 and, lastly, adding to that the product of multiplier 207. In a pipeline fashion, while register 504 temporarily stores the partial product for transform coefficient $C_2$, register 505 temporarily stores the partial product for coefficient $C_{10}$, register 506 stores the partial product for coefficient $C_{14}$ and register 507 stores the partial product for coefficient $C_6$. After 16 picture elements have been applied to lead 200, the output of register 507 contains the coefficient $C_2$, the output of register 504 contains the coefficient $C_{10}$, the output of register 505 contains the coefficient $C_{14}$, and the output of register 506 contains the coefficient $C_6$. These output coefficients are applied in the FIG. 5 circuit to parallel-to-serial converter register 600 which outputs on lead 601 a stream of the coefficients $C_0$–$C_3$ in accordance with the order depicted in FIG. 4. The above-described four-coefficient segment is representative of other segments. They differ only in the number of multipliers and the number of stages in the cyclical pipeline accumulator, and in the constants by which the input signals are multiplied.

All of the circuits making up the circuit of FIG. 5 are conventional digital elements. The representations of numbers can be in sign-magnitude form or any other signed representation. There is a slight advantage to the sign-magnitude form since elements 301–315 can simply perform on exclusive OR on the sign bit. Sign control ROM, 320, which develops the output signals on bus 300 is a small read-only memory. For the FIG. 5 circuit, it may simply be a 16×16 memory. Actually, additional symmetries can be employed to reduce the size of ROM 320, as well as the overall circuitry, as shown below.

Figure 7:
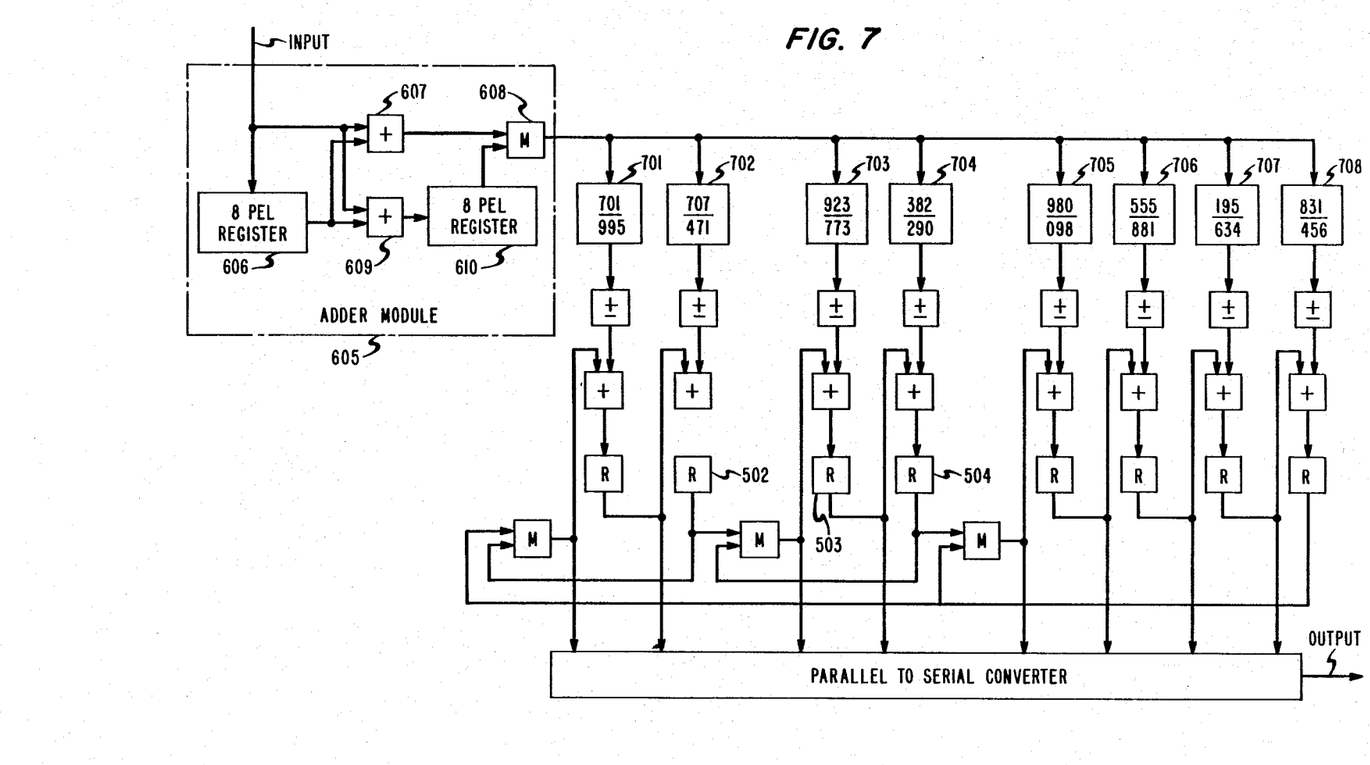
FIG. 7 depicts a different embodiment of a forward cosine transform circuit.

A slightly different hardware architecture for realizing the cosine transform coefficients is obtained by noting that the top left quadrant of the matrix in FIG. 4 is identical to the top right quadrant, and that the bottom left quadrant is the negative of the bottom right quadrant. FIG. 6 shows a simple re-arrangement of the matrix multiplication in FIG. 4 that exploits this symmetry, and FIG. 7 presents an architecture that implements this: It replaces the 16 one-constant multipliers of FIG. 5 with 8 two-constant multipliers. The elements making up the FIG. 7 circuit to correspond to the elements in FIG. 5, except for multiplexers 602, 603 and 604, (single pole, double switches), and input adder module 605. Multiplexers 602–604 are arranged to permit calculation of either the even coefficients (with three independently operating segments) as specified by the upper portion of FIG. 6, or the odd coefficients (with one operating segment) as specified by the lower portion of FIG. 6. When used to calculate the odd coefficients, multiplexer switches 602–604 are connected to terminals II, as shown in FIG. 7; when used for the even, they are switched to terminals I. It may be noted that more symmetry exists in the top of the matrix and that this symmetry could be used to further reduce the number of multiplications required to calculate the even coefficients. However, as 8 multipliers are required anyway for the odd coefficients, there is little to be gained in doing so. Input adder module 605 provides for the appropriate delay and combining of the input signals, as specified by FIG. 6. For calculating the even coefficients pels $P_0$ through $P_1$ (in the mixed order specified earlier) are delayed in register 606, added to pels $P_{15}$ through $P_{14}$ respectively in adder 607, and passed to multipliers 701–708 through multiplexer switch 608. Concurrently, pels $P_{15}$ through $P_{14}$ are subtracted from the delayed pels $P_0$ through $P_1$ in element 609, and the developed difference signals are delayed in register 610 and applied through multiplexer switch 608 to multipliers 701–708. Multipliers 701–708 differ from multipliers 301–315 in that they are arranged to multiply by either one of two constants. This implementation can be almost identical to that of multipliers 301–315. It may be noted that for sake of clarity that the FIG. 7 circuit does not show some of the obvious details.

Figure 8:
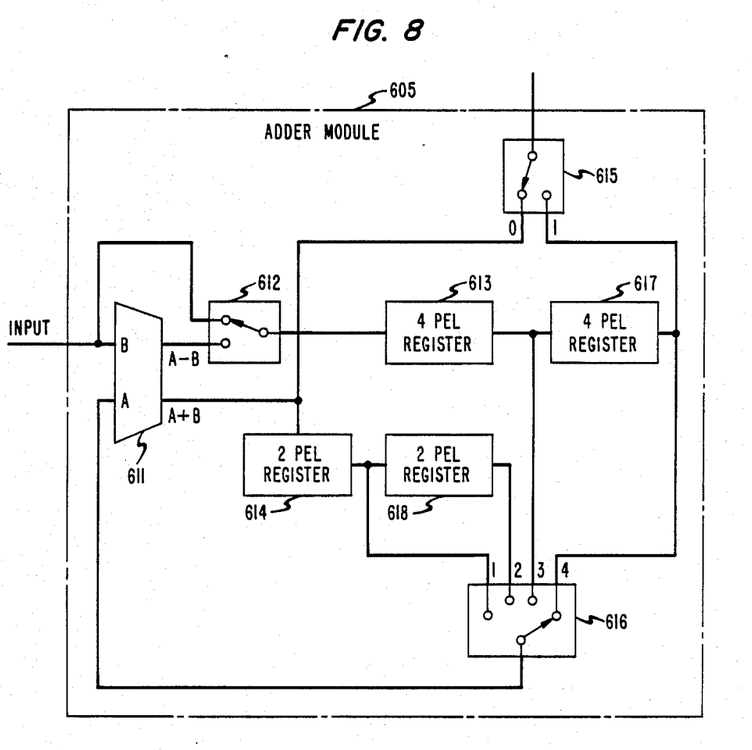
FIG. 8 illustrates another embodiment for the adder module included within the FIG. 7 transform circuit.

FIG. 8 illustrates another embodiment for adder module 605. It is more complex than the module depicted in FIG. 7, but, as will come to light below, the FIG. 8 module may be employed in the inverse discrete cosine transform as well. In FIG. 8, element 611 is a two-input and two-output arithmetic element. In response to inputs A and B, element 611 develops both $A+B$ and $A-B$ output signals. The $A-B$ output is applied through multiplexer switch 612 to a 4-pel register 613, and the $A+B$ output is applied to 2-pel register 614 and to 2-input multiplexer switch 615. The output of register 614 is applied to a secnd 2-pel register, 618, and to a first input of a 4-input multiplexer switch, 616. The output of register 618 is applied to a second input of switch 616, while the output of register 613 is applied to a third input of switch 616 and to the input of a second 4-pel register 617. Finally, the output of register 617 is applied to the fourth input of multiplexer switch 616 and to a second input of switch 615.

During the time when $P_0$ through $P_1$ are applied to the input, switch 612 is connected to the "in" input (as shown in FIG. 8) and switch 615 is connected to the output of register 617. At that time, the output of register 617 (and hence at the output of switch 615) is $P_0-P_{15}$ through $P_1-P_{14}$ of the previous sequence of pel signals. At the end of the first 8-pel sequence, pels $P_0$ through $P_1$ are stored in registers 617 and 613, switch 612 is connected to the A−B input, switch 615 is connected to the A+B output element of 611, and switch 616 is connected to the output of register 617. Pel signals $P_{15}$ thorough $P_{14}$ are then applied to the B input of element 611, yielding $P_0+P_{15}$ at the A+B output of element 611 and, correspondingly, at the output of switch 615; while yielding $P_0-P_{15}$ at the A−B output of 611 and into register 613 through switch 612. For the next eight input samples, the sum signals $P_0+P_{15}$ through $P_1+P_{14}$ appear at the output while the difference signals $P_0-P_{15}$ through $P_1-P_{14}$ are stored within registers 613 and 617 for output at the next sequence, as referenced above.

FIG. 9 presents the inverse transform matrix equation. The matrix of coefficients employed in computing the inverse transform is the mathematical transpose of that of the forward transform and, accordingly, the transposes of the blocks segregated in FIG. 5 can also be segregated in FIG. 9. In connection with the FIG. 5 matrix, three observations were made which led to the realization of the FIG. 7 circuit: one, that the cosine coefficients matrix can be rearranged to highlight symmetries by judicious reordering of the input signals and the sequence of transform coefficient computation; two, that by judicious segmentation of the computation task, selected transform coefficient sets can be computed in hardware that is shared in a cyclic pipeline fashion; and three, that a realization of the smaller segments can be had by time sharing the physical cyclic pipeline accumulator hardware that is used for the one largest segment.

Similar observations can be made in connection with FIG. 9 where the input samples are transform coefficients C, in the order $C_0$, $C_8$, $C_4$, $C_{12}$, $C_2$, $C_{10}$, $C_{14}$, $C_6$, $C_1$, $C_{11}$, $C_7$, $C_{13}$, $C_{15}$, $C_5$, $C_9$, and $C_3$, and the output is pel samples P, in the order $P_0$, $P_5$, $P_3$, $P_6$, $P_7$, $P_2$, $P_4$, $P_1$, $P_{15}$, $P_{10}$, $P_{12}$, $P_9$, $P_8$, $P_{13}$, $P_{11}$, and $P_{14}$. Specifically, as soon as the $C_0$ and $C_8$ samples arrive, all of the multiplications requiring use of the 0.707 multiplier can be carried out. When sample $C_4$ and $C_{12}$ arrive, all of the multiplications requiring use of the 0.923 multiplier and use of the 0.382 multiplier can be carried out, and so on.

FIG. 10 illustrates a rearranged version of the FIG. 9 matrix which highlights the horizontal as well as the vertical symmetries present in the matrix. In accordance with the upper portion of FIG. 10, the output pel samples can be obtained by adding four components, as specified by the four columns. Elements [A, B], [C, D], [E, F, G, H], and [I, J, K, L, M, N, O, P] identified in the upper portion of FIG. 10 are computed as specified in the lower portion of FIG. 10.

Figure 11:
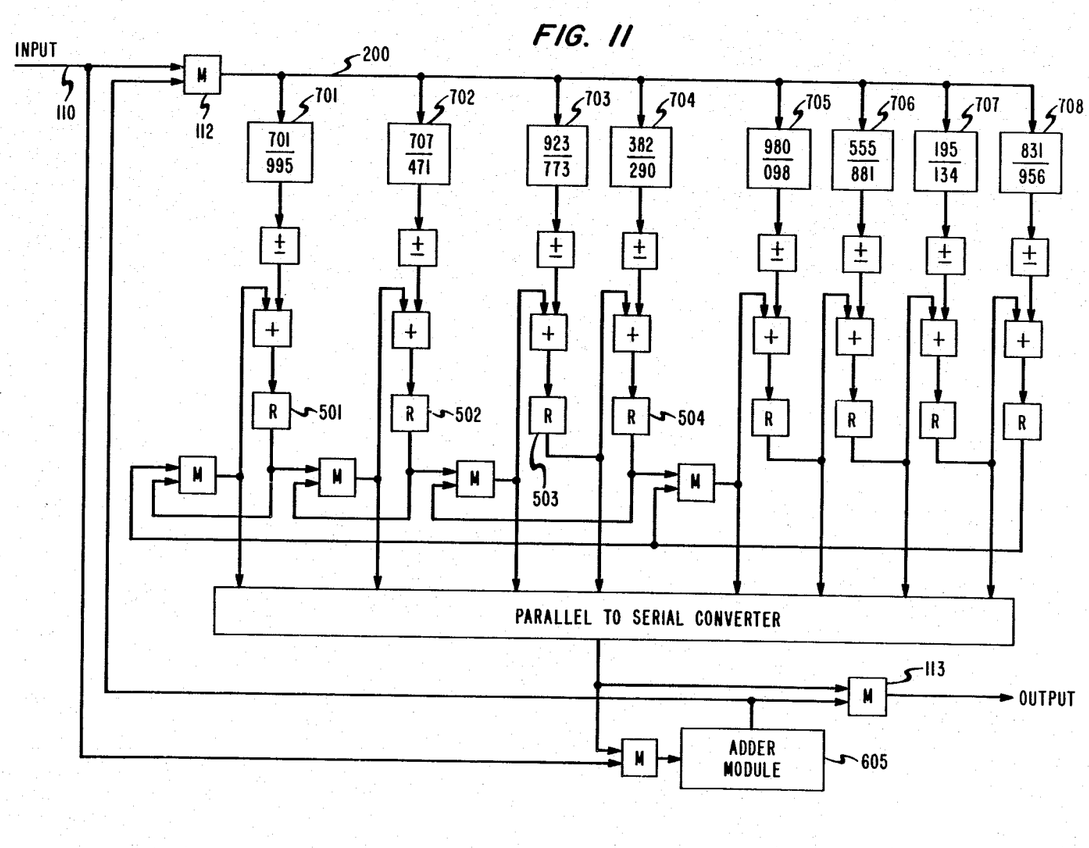
FIG. 11 presents a block diagram of a cosine transform generator capable of implementing both the direct discrete cosine transform and the inverse discrete cosine transform.

FIG. 11 is a transform generator that is capable of realizing both the forward discrete cosine transform and the inverse discrete cosine transform. Its operation in the forward transform mode has essentially been described earlier; so the following addresses only the inverse transform operation, except for the following comment. In the forward mode, input signals on line 110 are applied to adder module 605 through multiplexer switch 111, and from there to line 200 through multiplexer switch 212. The output of the circuit is derived from parallel to serial converter 600 through multiplexer switch 113. Switches 111, 112, and 113 are shown in FIG. 11 in their inverse discrete cosine transform position.

In the inverse transform, input signals (which are the cosine transform coefficients, C) are applied to bus 200 via multiplex switch 112 without going through adder module 605. It is assumed that the order of the applied cosine transform coefficients is as described above and depicted in FIG. 9. If a rearrangement in the order of the applied coefficients needs to be made, a memory made be provided to perform the reordering.

As soon as input samples $C_0$ and $C_8$ arrive, the A and B components of FIG. 10 are computed with the aid of multipliers 701 and 702, respectively. The A component is stored in register 501 and the B component is stored in register 502. When input samples $C_4$ and $C_{12}$ arrive, multipliers 703 and 704 are activated, and the cyclic pipeline accumulator segment of FIG. 11 which includes adders 403 an 404 and registers 503 and 504 develops the C and D components. The C component is stored in register 503 while the D component is stored in register 504. When the next four input samples arrive ($C_2$, $C_{10}$, $C_{14}$ $C_6$), multipliers 705-708 are activated and the cyclic pipeline accumulator segment of FIG. 11, which includes adders 405-408 and registers 505-508, develops the E, F, G, and H components. Upon completion of the computations required to generate the E, F, G, and H components, the contents of registers 505-508 which contain those components, and the contents of registers 501-504 are transferred to parallel-to-serial converter 600. During the next segment, while input samples $C_1$, $C_4$, $C_7$, $C_{13}$, $C_{15}$, $C_5$, $C_9$ and $C_3$ arrive, register 601 shifts its content through line 601 and switch 612 to adder module 605. Concurrently, multipliers 701-708 compute the I through P components in a manner identical to the computations performed in the forward transform. Upon completion of the computations required to generate the I through P components, the contents of registers 505-508 are transferred to parallel-to-serial converter 600 and shifted out via line 601 to adder module 605.

Adder module 605 receives the A through P components, seriatim, and its function is to add the various components in accordance with the specification embodied in the upper portion of FIG. 10. To develop $P_0$, for example, it needs to compute the value A+C+E+I. To develop $P_7$, it needs to compute the value of A+C−E+M. This combining of the necessary components is accomplished in the adder module depicted in FIG. 11 by controlling switches 616 and 615 in accordance with the table below.

TABLE

| cycle | switch 616 | switch 615 | cycle | switch 616 | switch 615 |
|---|---|---|---|---|---|
| 0 | x | 1 | 8 | 2 | 0 |
| 1 | x | 1 | 9 | 2 | 0 |
| 2 | 0 | 1 | 10 | 2 | 0 |
| 3 | 0 | 1 | 11 | 2 | 0 |
| 4 | 1 | 1 | 12 | 4 | 0 |
| 5 | 1 | 1 | 13 | 4 | 0 |
| 6 | 3 | 1 | 14 | 4 | 0 |
| 7 | 3 | 1 | 15 | 4 | 0 |

Since the addition and subtraction pattern in the upper portion of FIG. 10 is very regular, the adder module approach presented in FIG. 11 is quite good.

Other approaches are also possible, of course, such as the use of a random access memory and a ROM control of the access addresses and arithmetic operation to be performed.

Figure 2:
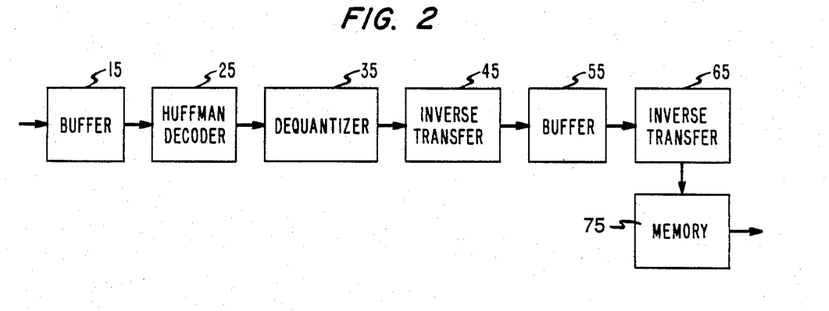
FIG. 2 is a block diagram of the inverse discrete cosine transform.

The above detailed description covers the details of circuits 20, 40, 25 and 45 in FIGS. 2 and 3. As is apparent from the above description, the memories preceding these circuits must implement the sample orderings that are prescribed. This can be achieved with very simple combinatorial circuits or, simpler still, with very small read-only memories that control the writing and reading in the memories.

The remaining circuitry in FIGS. 2 and 3 is completely conventional and is therefore left to the practitioner to select a design that best suits the designer.

As for the specific sequence of pel samples and cosine transform coefficient, it may be noted, for example, that in the illustrative example presented in the sequence 15, 10, 12, 9, 8, 13, 11, and 14 can be easily obtained by taking one's complement of the sequence 0, 5, 3, 6, 7, 2, 4, and 1; and that the latter sequence can easily be obtained by shifting right the binary representation of the sequence 1, 11, 7, 13, 15, 5, 9, and 3. Treating the sequence generation matter more generally, the following presents a method by which the sequences can be obtained for 8, 16, and 32 point transforms.

In the following equations, N is half the number of points in the transform, $p(x)$ be the xth pel subscript and $c(x)$ be the xth coefficient subscript; "x" represents the position of the subscript $p(x)$ or $c(x)$ in the list of subscripts. The first N values of $p(x)$ for a transform of size 2N may be found by the following procedure: Set $p(0)=c(0)=0$ and set $p(1)$ to values from 1 to $N-1$; get the remaining $p(x)$ for each setting of $p(1)$ from:

$$2p(x+1) = [(2p(x)+1)(2p(x)+1)] \bmod 2N \text{ for } 0 < x < N$$

The resulting permutation sets that involve all values from 0 to N are valid (some will be degenerate). To find the corresponding $c(x)$ the "ancestor" of each $p(x)$ must be found by swapping values N apart such that the smaller ones end up on the left. The series $p(x) 0 < x < N-1$ will correspond to the first N terms of the "ancestor" 2N point transform. The final N subscripts are given by the following:

$$p(x+N) = N-1-p(x) \text{ for } 0 < = x < N$$

$$c(x+N) = 2p(x)+1 \text{ for } 0 < = x < N.$$

Although only a number of particular implementations have been described for the direct and the inverse transforms, it is understood that other embodiments may be had which incorporate the principles of our invention. For example, other trigonometric function transforms may be realized, other reorderings of the cosine coefficients matrix can be employed to develop different hardware organizations, different hardware can be employed for pre-processing and post-processing, etc. It should be understood, therefore, that the above disclosure is merely illustrative of the principles of my invention and is not limiting in any sense.

What is claimed is:

1. A circuit for developing a plurality of transform coefficient signals comprising:
    a plurality of multipliers, each capable of multiplying by one of at most two fixed constants, responsive to sequences of applied input signals, for developing sequences of product signals;
    means for reversing the sign of said product signals in accordance with a predetermined sequence for each of said multipliers; and
    a plurality of cyclical pipelined accumulator means responsive to said means for reversing, each capable of applying its output signal to its input and developing different ones of said transform coefficient signals.

2. The circuit of claim 1, further comprising input signal reordering means interposed between said sequences of said applied input signals and said plurality of constant multipliers.

3. The circuit of claim 1 further comprising output signal reordering means responsive to said transform coefficient signals.

4. The circuit of claim 1, further including means responsive to said transform coefficient signals for receiving said transform coefficient in parallel and providing said transform coefficient signals serially at an output port of said transform circuit.

5. The circuit of claim 4 further comprising output signal reordering means responsive to said transform coefficient signals serially appearing at said output port of said transform circuit.

6. The circuit of claim 5, further comprising input signal reordering means interposed between said sequences of said applied input signals and said plurality of constant multipliers.

7. The transform circuit of claim 1 wherein each of said cyclical pipeline accumulators comprises:
    a plurality of combine-and-store networks, each having two inputs and one output, for arithmetically combining signals at said two inputs, storing the combined signals and making the stored signals available at said one output, with
    said combine-and-store networks connected in a ring, where one of said inputs of each of said combine-and-store networks is connected to said output of another one of said combine-and-store networks, and said second input of each of said combine-and-store networks is responsive to said product signals.

8. A transform circuit for developing a set of transform signals from a sequence of applied input signals comprising:
    a plurality of multipliers responsive to said input signals, each multiplying said input signals by one of at most two different preselected constants and developing thereby a plurality of product signals; and
    cyclical pipeline accumulator means responsive to said plurality of product signal including means for applying its output signal to its input, for adding to or subtracting from a developing set of transform signals of said input signals, with said adding to or subtracting from said developing set of transform signals being controlled in accordance with a preselected sequence, and said developing set of transform signals becoming said set of transform signals upon completion of said adding or subtracting.

9. The transform circuit of claim 8 wherein said cyclical pipeline accumulator means comprises:
    a plurality of combine-and-store networks, each having two inputs and one output, for arithmetically combining signals at said two inputs, storing the combined signals and making the stored signals available at said one output, with said combine-and-store networks connected in a ring, where one of said inputs of each of said combine-and-store networks is connected to said output of another one of said combine-and-store networks, and said second input of each of said combine-and-store networks is responsive to said product signals.

10. A circuit for developing a $2^i$ point transform from $2^i$ input samples where i is an integer comprising:

$2^i-1$ multipliers, each responsive to said $2^i$ input samples and each multiplying said input samples by a fixed constant to develop product signals;

means for reversing the sign of said product signals in accordance with a predetermined sequence for each of said multipliers; and each of said cyclical pipelined means being capable of applying its output signal to its input, a plurality of cyclical pipeline accumulator means responsive to said means for reversing, for developing $2^i$ transform coefficient signals.

11. The circuit of claim 10 wherein said transform is a cosine transform and said constants are cosine values of the angles comprising the multiples of $\pi/(4\ 2^i)$.

12. The circuit of claim 10 wherein said plurality of cyclical pipeline accumulator means includes a pipelined arrangement of $2^{i-1}$ two input adders supplying signals to one register in a set of $2^{i-1}$ registers, with one input of each of said adders being responsive to said product signals and the other input of each of said adders being responsive to a different register from said set of registers.

13. A two dimensional transform generator comprising:

a first one-dimensional transform generator responsive to input signals including a first plurality of multipliers, each capable of multiplying by one of at most two fixed constants, for developing sequences of first product signals; first means for reversing the sign of said product signals in accordance with a predetermined sequence for each of said multipliers in said first plurality of multipliers; and a first plurality of cyclical pipeline accumulator means each of said cyclical pipelined accumulator means being capable of applying its output signal to its input, responsive to said first means for reversing, for developing intermediate coefficient signals, an intermediate reordering memory responsive to said intermediate coefficient signals; and a second one-dimensional transform generator including a second plurality of constant multipliers, connected to said intermediate reordering memory, for developing sequences of second product signals; second means for reversing the sign of said second product signals in accordance with a predetermined sequence for each of said multipliers in said second plurality of multipliers; and a second plurality of cyclical pipeline accumulator means each of said cyclical pipeline accumulator means being capable of applying its output signal to its input, responsive to said second means for reversing, for developing final coefficient signals.

14. The two dimensional transform generator of claim 13 further comprising a preprocessing reordering memory interposed between said inputs signals and said first one-dimensional transform generator.

15. The two dimensional transform generator of claim 13 further comprising a postprocessing reordering memory responsive to said final coefficient signals.

16. The apparatus of claim 14, further comprising: means for applying image samples to said preprocessing reordering memory to develop discrete cosine transform coefficients at said final set of coefficient signals, and means for compressing said final set of coefficient signals.

17. The apparatus of claim 15, further comprising means for applying discrete cosine transform signals to said first one-dimensional transform generator to develop image samples at said final set of coefficient signals.

* * * * *